United States Patent [19]
Muramatsu

[11] Patent Number: 5,253,450
[45] Date of Patent: Oct. 19, 1993

[54] INSECT TRAP

[76] Inventor: Scott Muramatsu, 13311 SE. Beech, Milwaukie, Oreg. 97222

[21] Appl. No.: 923,824

[22] Filed: Aug. 3, 1992

[51] Int. Cl.⁵ ............................................. A01M 1/10
[52] U.S. Cl. ..................................... 43/122; 43/107; 43/121
[58] Field of Search ........................... 43/107, 121, 122

[56] References Cited

U.S. PATENT DOCUMENTS

| | | | |
|---|---|---|---|
| 109,282 | 11/1870 | Williams | 43/121 |
| 111,291 | 1/1871 | Williams | 43/121 |
| 119,435 | 9/1871 | Webb | 43/121 |
| 147,226 | 2/1874 | Defranceschini | 43/121 |
| 181,165 | 8/1876 | Hagen | 43/121 |
| 944,568 | 12/1909 | Mercer | 43/121 |
| 1,024,187 | 4/1912 | Donaldson | 43/107 |
| 1,672,576 | 6/1928 | Meyer | 43/121 |
| 1,857,890 | 5/1932 | Sullivan | 43/107 |
| 4,244,135 | 1/1981 | Harwoods . | |
| 4,263,740 | 4/1981 | Hemsarth | 43/121 |
| 4,360,987 | 11/1982 | Lowder . | |
| 4,442,624 | 4/1984 | Browne . | |
| 4,642,936 | 2/1987 | Jobin et al. . | |
| 4,738,049 | 4/1988 | Baley . | |
| 4,793,092 | 12/1988 | Avittan . | |

FOREIGN PATENT DOCUMENTS

| | | | |
|---|---|---|---|
| 517494 | 6/1920 | France | 43/121 |
| 293187 | 2/1932 | Italy | 43/121 |

*Primary Examiner*—Kurt C. Rowan
*Attorney, Agent, or Firm*—Chernoff, Vilhauer, McClung & Stenzel

[57] ABSTRACT

An insect trap is made by cutting and folding blanks of a pliable material. The insect trap is comprised of two pieces: a multifaceted, hollow chamber and a tubular inlet. The chamber is made from a blank of cardboard having tabs and slits which can be folded and the tabs inserted into the slits to form, in a preferred embodiment, a frustum of a hollow, pyramid having a port at a truncated apex. The port is open to the hollow interior. The tubular inlet is made from a blank cut from paper having an adhesive side and folded in a revolute manner to form a shape of a frustum of a tubular pyramid that has a plurality of tongues extending outward from an open base of the pyramid. The insect trap is assembled by inserting the inlet into the port of the multifaceted chamber and pressing the adhesive side of the tongues down against the facets of the chamber thereby joining the facets together. A attractant inside the chamber lures the insects through the inlet into the hollow interior of the chamber wherein they become trapped.

7 Claims, 2 Drawing Sheets

INSECT TRAP

BACKGROUND OF THE INVENTION

1. Field of the Invention

This invention relates to insect traps and more particularly to lightweight, inexpensive insect traps that fit in the interstices of jumbled fruit.

2. Description of the Related Art

Many insect traps have been designed that lure insects through a small hole into an enclosure. It is also well known to provide a funnel-shaped inlet device that has a large outer opening which tapers down to a small inner opening located inside the enclosure. These traps rely upon the insect's inability to navigate its way out from the enclosure through the small opening. Insects are typically attracted into the enclosure by either light or chemical attractants. Examples of insect traps that use a funnel-shaped inlet device to trap insects in an enclosure are: Harwoods, U.S. Pat. No. 4,244,135; Baley, U.S. Pat. No. 4,738,049; and Avittan, U.S. Pat. No. 4,793,092. Harwoods and Baley disclose insect traps having many molded parts that must be assembled together and which use clear plastic enclosures. The use of molded parts is undesirable because it is expensive and the clear enclosure is undesirable because the dead insects are visible, making the traps unsuitable where food is sold or prepared. Avittan discloses a simple fly trap design that is made from two cardboard pieces to provide an enclosure and a funnel-shaped device. Avittan suffers from having a shape that is incompatible with the interstices of jumbled fruit and further suffers from its difficult-to-manufacture funnel-shaped inlet device.

SUMMARY OF THE INVENTION

The present invention provides an insect trap which fits in the interstices of jumbled fruit and provides a shape that may be placed in jumbled fruit without offending vendors and consumers. Furthermore, the design of the trap provides for easy manufacture and assembly. The insect trap is made from two pieces that have a symbiotic relationship wherein one element suspends the other element, which in turn holds together the sides of the first element.

As stated, the present invention provides a trap that can be constructed from two pieces. The first piece is a multifaceted, hollow chamber that, in a preferred embodiment, is made by cutting a blank from a pliable material such as cardboard and folding it to provide a chamber in the shape of a frustum of a hollow pyramid with a port open to the hollow interior. The second piece is an inlet that, in a preferred embodiment, is made by cutting a blank from a pliable material such as paper having an adhesive on one side. The adhesive paper is cut and folded into the shape of a frustum of a tubular pyramid with tongues projecting outward from an open base. The inlet is inserted into the port of the multifaceted, hollow chamber and the tongues are folded down and adhered to the exterior surface of the chamber thereby holding its facets together. The design is efficient to manufacture, both in terms of materials and labor to assemble and the pyramidal shape of the chamber is compatible with the interstices of jumbled fruit.

It is a principal object of the present invention to provide an insect trap in which a tubular surface is inserted into a port in a multifaceted chamber to provide an inlet into the chamber and also to hold together the sides of the chamber.

It is an object of the present invention to provide such an insect trap by cutting and folding a pliable material to create the chamber and cutting and folding a pliable material having an adhesive side to create the tubular surface.

It is a further object of the present invention to provide a method of trapping insects by making a multifaceted chamber and a tubular surface that fits into a port in the chamber and is suspended within an interior cavity of the chamber such that insects may enter the chamber through the tubular surface and be trapped within.

The foregoing and other objectives, features and advantages of the present invention will be more readily understood upon consideration of the following detailed description of the invention taken in conjunction with the accompanying drawings.

DESCRIPTION OF THE PREFERRED EMBODIMENT

Figure 2:
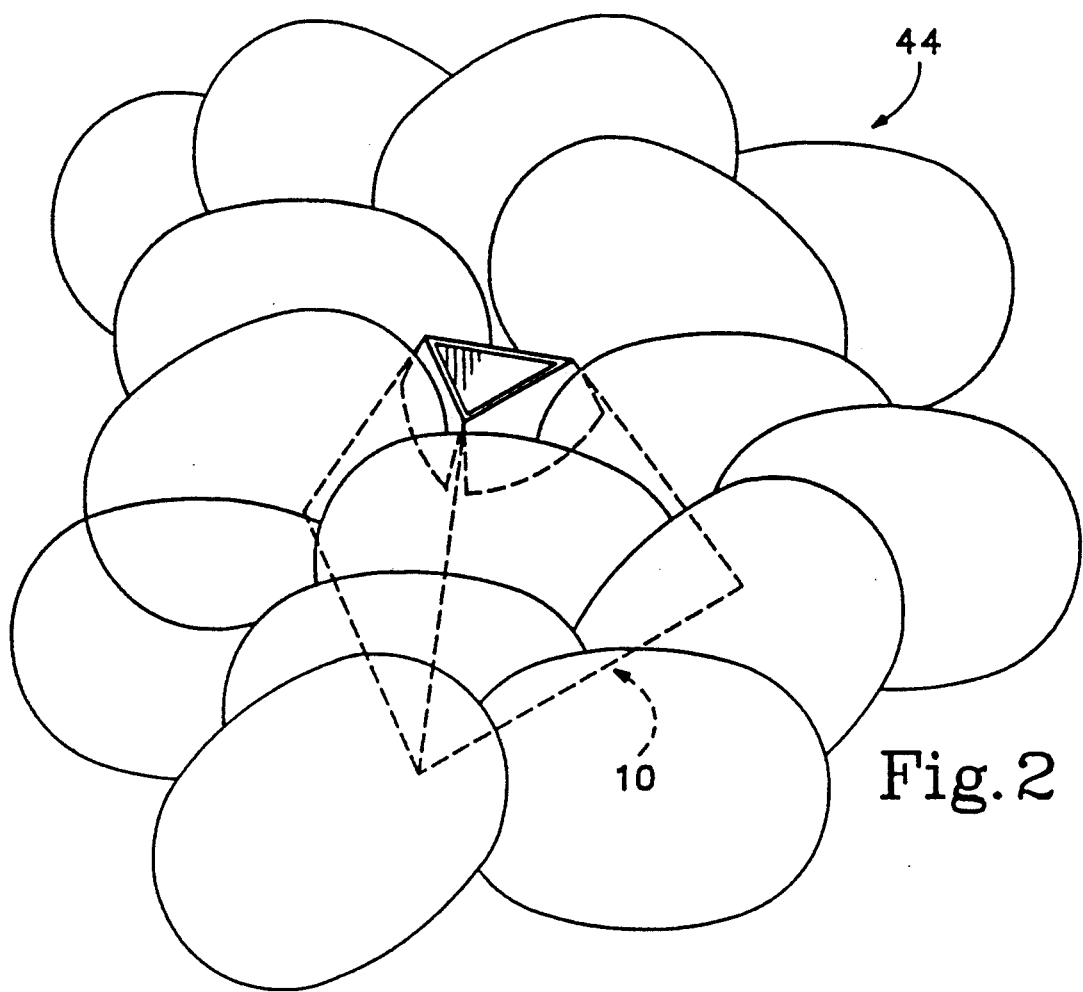
FIG. 2 is a perspective view of the insect trap of FIG. 1 shown located in the interstices of jumbled fruit.
Figure 1:
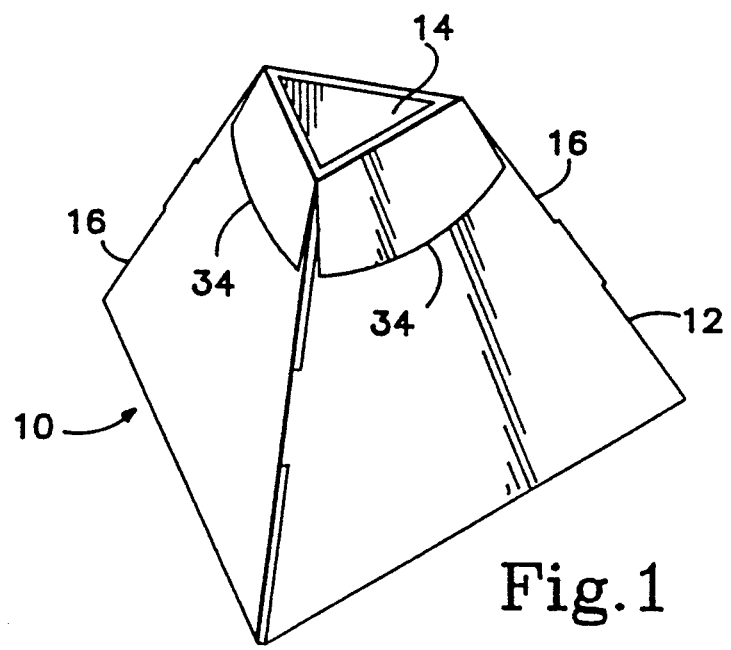
FIG. 1 is a perspective view of a preferred embodiment of an insect trap of the present invention.

An insect trap 10, shown in its preferred embodiment in FIG. 1, has two parts: a multifaceted, hollow chamber 12 and a tubular inlet 14. In its preferred embodiment, the chamber 12 has the shape of a frustum of a pyramid. The chamber 12 has three facets 16, a base 18, an open interior 20 and a port 22. The port 22, formed where the pyramid is truncated, opens into the hollow interior 20.

In the preferred embodiment the inlet 14 also has the shape of a frustum of a pyramid. The inlet 14 is tubular with an open base 30, an open apex 32 and a surface 33 that tapers between the open base 30 and open apex 32. One side of the inlet is provided with an adhesive 36. Extending outward from the open base 30 are a plurality of tongues 34 that overlie, and adhere to, the exterior surface 21 of the chamber 12 when the chamber and inlet are assembled together as fully described below.

An insect attractant 40 is placed inside the chamber 12 to lure insects. Lured by the attractant, insects enter the inlet's open base 30 and follow the tapering surface 33 to the open apex 32 which leads them into the hollow interior 20 of chamber 12. Once inside the chamber the insects are trapped due to their inability to navigate out through the small opening at the apex 32 of the inlet 14.

The pyramidal shape of chamber 12 is an ideal shape for placing the insect trap in a jumble of fruit 44 where it nests inconspicuously in the interstices formed between the fruit. The insect trap may be embodied in different sizes to accommodate the interstices of a jumble of different types of fruit such as oranges or cantaloupes.

The two-piece design of the present invention is efficient in both material and assembly time. Furthermore, each piece may be shipped flat and easily assembled by the consumer. Each piece is made from a blank that is cut or stamped from a pliable material such as cardboard or paper.

Figure 4:
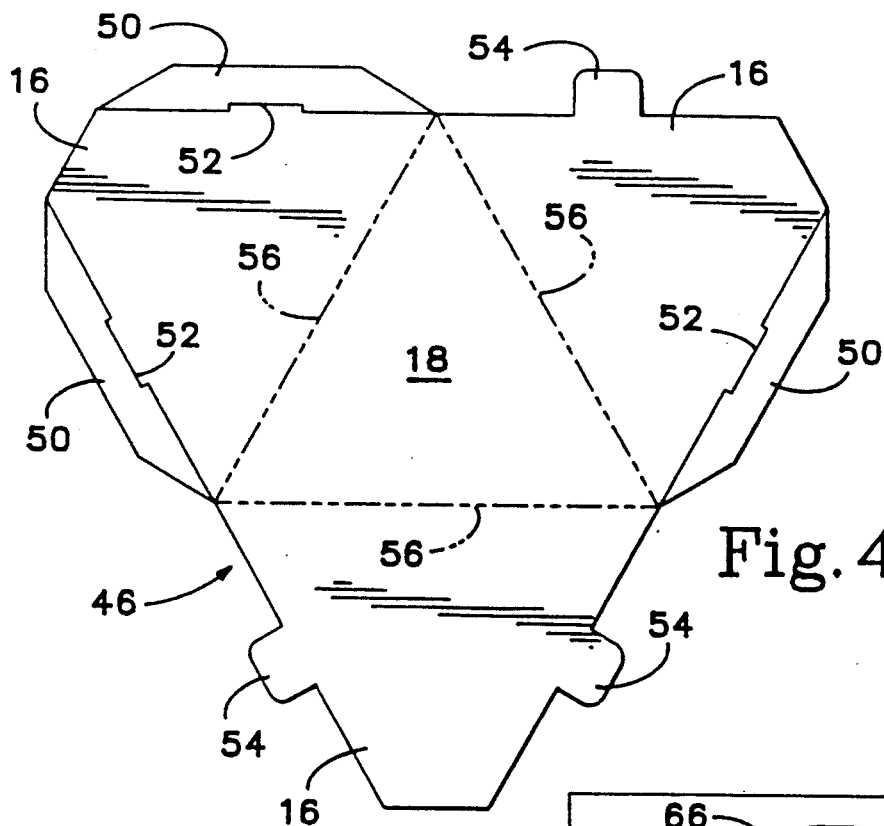
FIG. 4 is a plan view of a blank used to construct the chamber of the insect trap of FIG. 1.

The preferred embodiment for making the multifaceted chamber 12 is a blank 44 (FIG. 4) having a generally triangular shape with a plurality of gussets 50, slits 52, and tabs 54. Optimally, the blank 44 is scored with fold lines 56 to facilitate easy folding. After the blank 44 has been cut and the fold lines 56 have been scored, the facets 16 are folded up and away from the plane of the base 18 and the tabs 54 are inserted into the slits 52 forming the frustum of a pyramid which is the preferred shape of the chamber 12. At this point the facets 16 of the chamber are held together only by the friction of the tabs within slits 52. It is desirable, therefore, to more securely join the facets 16 together in order for the insect trap to be handled and jarred without springing open.

Figure 5:
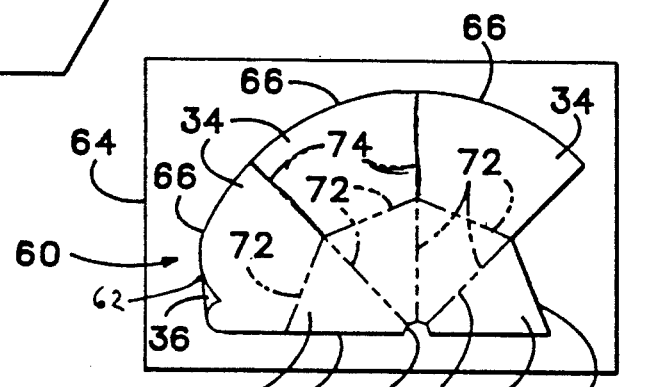
FIG. 5 is a plan view of a blank used to construct a tubular surface which is an element of the insect trap of FIG. 1.
Figure 3:
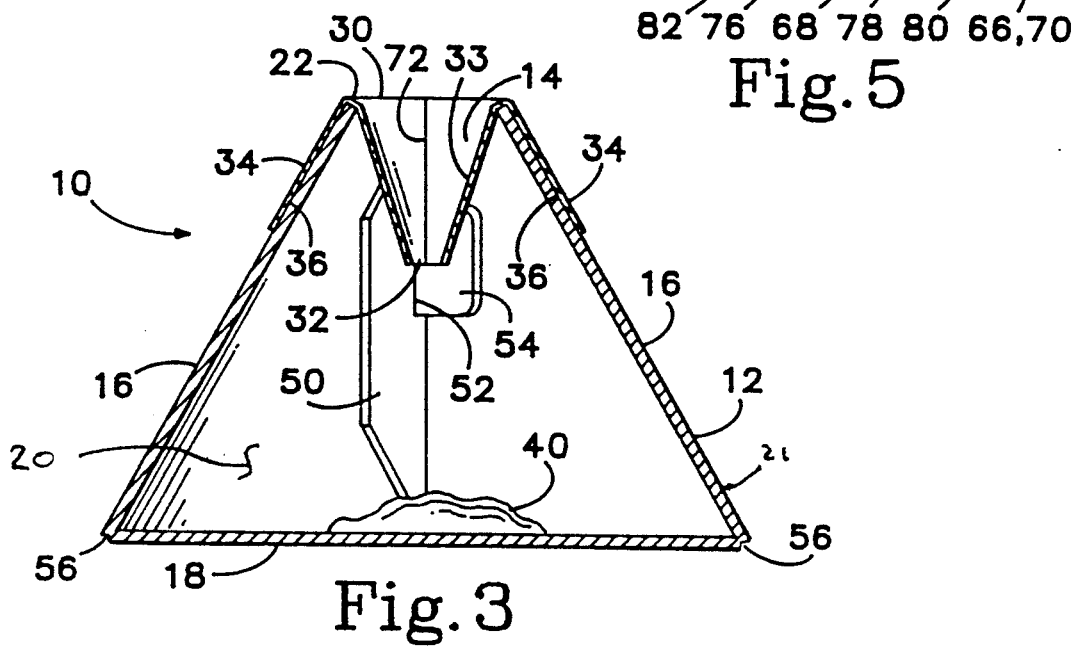
FIG. 3 is a cross-sectional elevation view of the insect trap of FIG. 1.

The preferred embodiment for making the inlet 14 is a blank 60 (FIG. 5) that is cut from self-adhesive paper 62 that has an adhesive side 36 covered by a non-stick backing 64. The blank 60 has a general shape of a semicircle with four sectors 66. Three of the sectors 66 are complete with the exception of a small cut-away portion at the apex 68 which will form the opening 32 when the blank is assembled into the inlet 14. A fourth sector 70 is truncated. The blank 60 has a plurality of fold lines 72 and cut lines 74. The cut lines 74 allow the tongues 34 to be separate from each other. After the blank 60 has been cut and the fold lines 72 have been scored, the blank 60 may be removed from the non-stick backing 64 and folded along the fold lines 72 and at the same time manipulated in a revolute manner to create the frustum of a tubular pyramid shape of the preferred embodiment. An edge 76 is aligned with a fold line 78 so that panel 80 and 82 overlap and the adhesive side of panel 82 is pressed against the surface of panel 80 thereby securing the tubular surface in the preferred shape. In this configuration the tongues 34 now extend outward from the open base 30.

The two parts of the insect trap 10 are assembled by inserting the inlet 14 into the port 22 with the apex 32 oriented down. Thereafter, the tongues 34 are pressed downward so that the adhesive surface 36 comes into contact with the exterior surface 21 of chamber 12 thereby joining together the facets 16. The inlet 14 is suspended from the port 22 into the hollow interior 20 of the chamber 12. The insect trap 10 is now sturdy and capable of being readily handled without concern that it may spring open releasing its contents. The insect trap is also in a condition to be inserted into the interstices of jumbled fruit.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An insect trap, comprising:
(a) a first blank of pliable material having fold lines;
(b) a second blank of pliable material; and
(c) said first blank and said fold lines being arranged such that said first blank can be manipulated along said fold lines into a multifaceted chamber having an interior cavity and an exterior surface defining a port open to said cavity and said second blank can be manipulated revolutely into a tubular surface that can be suspended within said cavity through said port in a manner to produce an inlet into said interior cavity and said tubular surface can be attached to said exterior surface in a manner to join together the facets of said multifaceted chamber.

2. The insect trap of claim 1 wherein said multifaceted chamber is a frustum of a pyramid and said port is at a truncated apex thereof.

3. The insect trap of claim 2 wherein said pyramid has three sides and a base.

4. The insect trap of claim 1 wherein said tubular surface is a frustum of a tubular pyramid having an open base and an open apex.

5. The insect trap of claim 1 wherein said multifaceted chamber is of a size and shape to fit within the interstices of jumbled fruit.

6. A method of trapping insects, comprising the steps of:
(a) cutting a blank from a pliable material, said blank having a plurality of tabs and a plurality of gussets, each gusset having a slit for receiving one of said tabs, folding said blank along predetermined fold lines, and aligning and inserting said tabs into said slits thereby forming a multifaceted chamber having an interior cavity and an exterior surface defining a port into said cavity;
(b) making a tubular surface that is open at each end thereof;
(c) inserting said tubular surface into said port; and
(d) suspending said tubular surface in said cavity.

7. A method of trapping insects, comprising the steps of:
(a) making a multifaceted chamber having an interior cavity and an exterior surface defining a port into said cavity;
(b) cutting a blank from a pliable material, folding said blank along predetermined fold lines and then manipulating said blank in a revolute manner to create a tubular configuration, and joining said blank in said tubular configuration thereby making a tubular surface that is open at each end thereof;
(c) inserting said tubular surface into said port; and
(d) suspending said tubular surface in said cavity.

* * * * *